Patented July 23, 1940

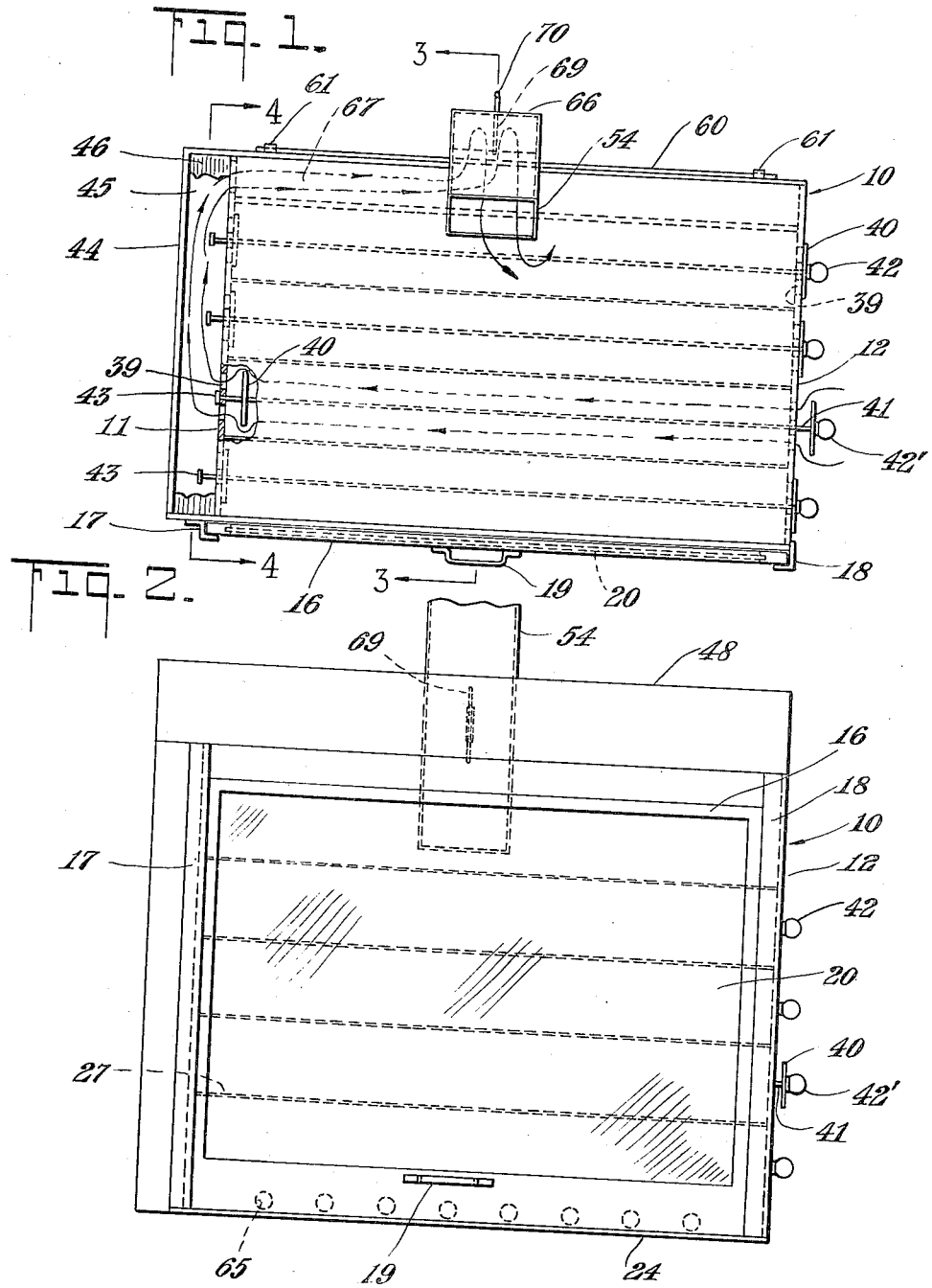

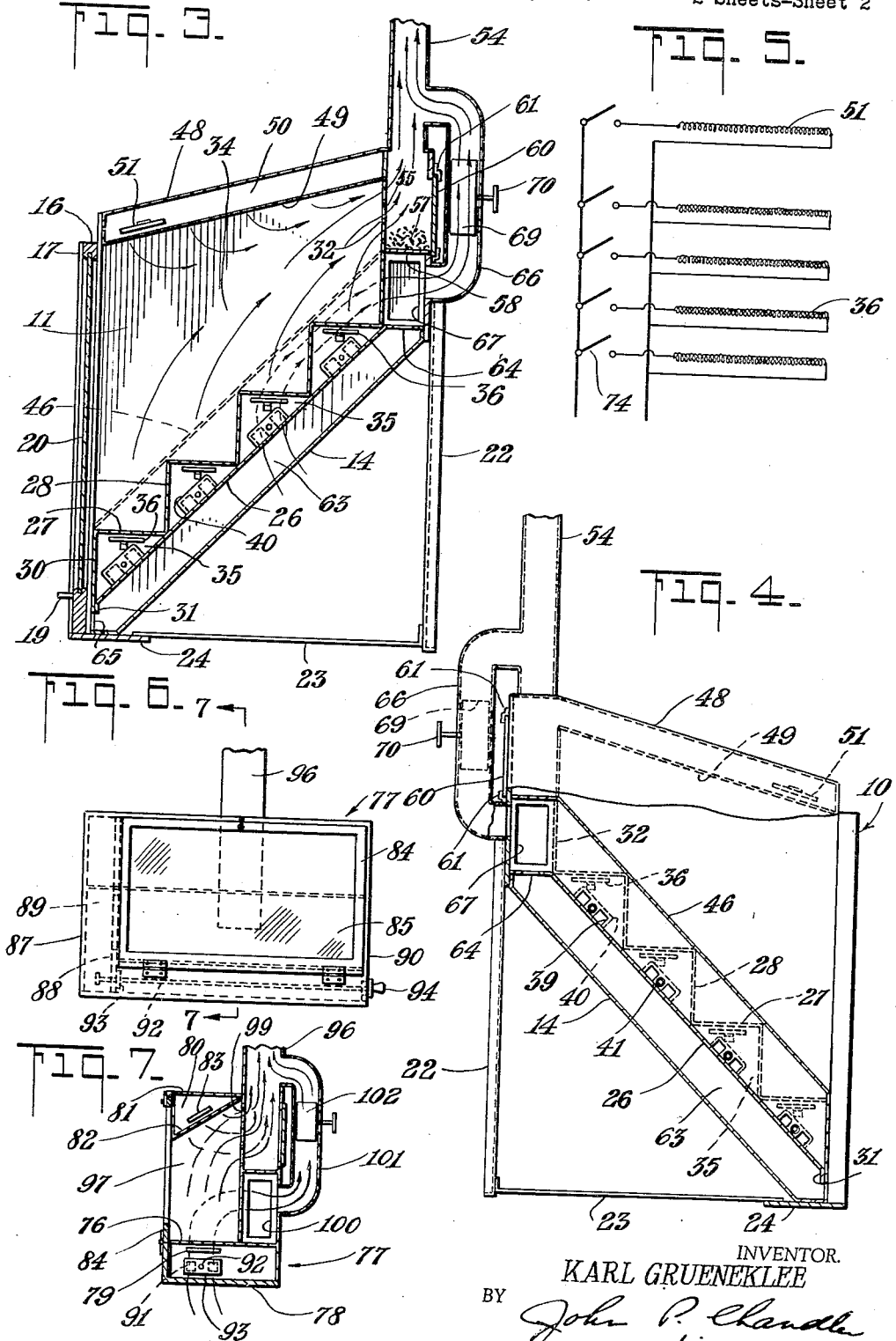
July 23, 1940.  K. GRUENEKLEE  2,209,099
HEATING AND COOLING RECEPTACLE
Filed June 21, 1939  2 Sheets-Sheet 2
INVENTOR.
KARL GRUENEKLEE
BY John P. Chandler
his ATTORNEY.

2,209,099

UNITED STATES PATENT OFFICE 2,209,099

HEATING AND COOLING RECEPTACLE

Karl Grueneklee, Stanhope, N. J., assignor of fifty per cent to Frederic B. Junghans, Netcong, N. J.

Application June 21, 1939, Serial No. 280,225

13 Claims. (Cl. 257—6)

This invention relates to new and useful improvements in heating devices, particularly for use in chemical laboratories, the apparatus being especially useful for heating and cooling liquids in cases wherein temperatures are critical and wherein it is occasionally desirable to quickly reduce the temperature of the heating surface. The present application constitutes a continuation in part of my co-pending application Serial No. 132,549 (allowed Dec. 22, 1938 and forfeited).

One of the principal objects of the present invention is the provision of an improved heating element having a surface adapted to support containers for the liquids which are to be heated and being provided with means for heating such surface to any desired temperature and also for cooling the surface when desired.

In its preferred embodiment, the device constituting the present invention comprises a plurality of heating surfaces disposed in stepped arrangement, each surface having individual heating and cooling means whereby temperatures of beakers or other receptacles placed upon such surfaces may be individually controlled, the several heating areas being mounted in a container or housing which confines the heat and prevents the gasses from being dispersed throughout the laboratory.

A further object of the invention is to provide a heating device of the type described and being provided with a plurality of individually controlled heating surfaces arranged in stair-like position relative to each other, the device having means for permitting observation of the liquids or other materials being heated to determine change of color and volume, boiling point, consistency, crystallization, etc. Also, by employing separate heating elements for each heating surface and means for varying the heat of each element, a considerable saving of current is effected.

Another object of the invention is the provision of an improved heating device of the class described wherein a closed chamber is provided immediately beneath the heating surface, such chamber containing an electrical heating element adapted to impart heat to said surface, such chamber further having a novel cooling means comprising air inlet and outlet ports at opposite ends thereof, and suction means whereby air from the outer atmosphere may be drawn through the chamber for the purpose of cooling the same.

Yet another object of the invention is to provide a heating and cooling device including an improved housing having means for permitting inspection of and ready access to the materials being heated and means for preventing condensation of the gasses on the walls and top of such housing.

A still further object of the invention is the provision of a closed heating device wherein novel means are provided for confining the gasses emitted from the heated materials and withdrawing such gasses from the heating chamber.

In the drawings:

Fig. 1 is a top plan view, partially in section, of the preferred embodiment of the present invention;

Fig. 2 is a front elevation thereof;

Fig. 3 is a transverse vertical section taken on line 3—3 of Fig. 1;

Fig. 4 is a transverse vertical section taken on line 4—4 of Fig. 1;

Fig. 5 is a diagrammatic view of the preferred wiring arrangement;

Fig. 6 is a front elevation of a modified embodiment of the present invention;

Fig. 7 is a transverse vertical section taken on line 7—7 of Fig. 6.

The presently preferred embodiment of the invention comprises a housing 10 having end walls 11 and 12, respectively, a lower diagonally inclined wall 14 and a vertically slideable front wall 16. This front wall or cover 16 is supported in a pair of opposed slideways 17 and 18, respectively, such slideways being mounted at opposite ends of the housing. The cover is further provided with a handle 19. In order to permit the contents of the housing to be viewed from the exterior thereof, this slideable wall 16 is formed as a frame, as shown in Fig. 3, and is provided with a sheet of transparent heat resisting material 20. Beneath the lower diagonal wall 14 the structure is open and the rear portion of the casing is supported by means of a pair of opposed angles 22 which are connected at their lower ends with the front portion of the casing by means of flat strips 23, the forward end of such strips being welded or otherwise secured to a base plate 24.

A second diagonally disposed wall 26 is spaced above and is substantially parallel with the wall 14 and the area between such walls 14 and 16 serves to insulate the housing from the exterior atmosphere, and, as will be later described, forms a chamber 63 through which gasses heavier than air may be exhausted. On the upper surface of the wall 26 a plurality of stepped elongated plates 27 are positioned, the upper surface of such plates being adapted to receive the beakers or other receptacles which are to be heated or cooled. The rear edge of each plate 27 is connected with the front edge of each adjacent plate by means of a vertical plate 28, and, in the preferred construction, the series of horizontal and vertical plates 27 and 28 may be formed from a single sheet of flat material which is bent as shown in Fig. 3, thus forming a stepped heating structure. The sheet of material forming the heating structure terminates in the front of the device in a vertical portion 30, the lower end of which is secured to a vertical portion 31 of the wall 26. At the rear of the device the sheet of material is bent upwardly to form a rear vertical wall 32 of the heating chamber, which chamber is designated as 34.

There is thus formed between the lower surface of each elongated plate 27 and the lower wall 26, a plurality of closed elongated chambers 35 which are triangular in transverse section. Within each chamber and beneath the lower surface of each elongated plate 27, an electrical heating element 36 is suitably mounted, also shown in Fig. 3. Any suitable electrical heating elements may be employed for this purpose and the several elements may be individually controlled in a manner hereinafter described, and when it is desired to heat the surface of the plates 27, an appropriate circuit for the heating elements is closed.

The following means are provided for cooling the heating surfaces. The end wall 12 is formed with a plurality of diagonally disposed spaced square openings 39. The number of such openings is a matter of choice but it is preferred to provide two of such openings for each chamber 35 and during the heating operation each pair of such openings are closed by means of a rectangular closure plate 40 which is mounted at one terminal of a rod 41 having a handle 42 on the exterior of the housing adjacent to the wall 12, all as shown in Fig. 1. The end wall 11 is likewise formed with a plurality of square diagonally disposed spaced openings 39, shown clearly in Fig. 4, which openings are also normally closed by means of rectangular closure plates 40 mounted at the opposite end of the rods 41. Thus when it is desired to open one of the elongated chambers 35 for the purpose of cooling the same, one of the handles 42 is drawn outwardly as shown at 42' in Figs. 1 and 2, thus moving the closure plates 41 to a point spaced from the square openings. Outward movement of the rods is limited by means of a stop member 43 at the inner end of each rod (Fig. 1). A second end wall 44 is mounted on the left hand end of the casing when viewed in the position shown in Fig. 1, such end wall being spaced from the end wall 11. A diagonally inclined plate 46 is positioned between the end walls 11 and 44, such plate being spaced above and being substantially parallel with the lower wall 14, all as shown in Fig. 4. There is thus formed a diagonally disposed chamber 45 defined by the end walls 11 and 44, the lower wall 14 and the plate 46, and when air is drawn from such chamber 45 in the manner hereinafter described, the relatively cool air from the outside atmosphere is drawn through the elongated chambers 35, thus cooling such chambers and the elongated heating surfaces 27.

The following means are provided for preventing condensation of the gases on the upper wall of the housing. The housing includes an upper wall 48 and a second upper wall 49 spaced from the lower surface thereof, thus forming a chamber 50 therebetween. Within this chamber a heating element 51 is positioned, which element imparts heat to the wall 49. Gases from the housing, as well as air during the cooling operation, are withdrawn through a duct 54 associated with the rear wall of the housing. The vertical wall portion 32 is formed with a plurality of apertures 55 and the passage of gases from the heating chamber 32, through such apertures 55 and into the duct 54, is shown by the arrows in full lines in Fig. 3.

Any solid particles which may accompany the gases fall after they pass through the apertures 55 and such particles, collecting at 57 on the horizontal wall 58 at the lower end of the duct 54, may be removed by means of a slideable clean-out door 60 supported by slideways 61.

A chamber 63 formed between the lower walls 14 and 26 may also accumulate gases and these are withdrawn through an aperture 64 in a horizontal extension of the lower wall 14. Such gases may also escape through apertures 65 at the front end of such chamber. The duct 54 is formed with a by-pass portion 66 which connects with a horizontal duct 67 leading from the center of the rear wall to the upper end of the chamber 45 formed between the walls 11 and 44. Accordingly, it will be apparent that when the closure plates 40, mounted on the rods 41, are withdrawn from the openings 39 at each end of the casing, air drawn through the chambers 35 passes through the diagonal chamber 45, through the duct 67, through the by-pass 66 and into the main duct 54, as shown by the arrows in Fig. 1. A damper 69 operated by a handle 70 controls the amount of air which may pass through said chambers 35.

The circuit illustrated in Fig. 5 is suggestive only and includes the heating elements 36 controlled by individual switches 74 and if desired suitable resistances or other means may be employed to provide "low", "medium" and "high" heat from each coil.

The modified embodiment of the invention illustrated in Figs. 6 and 7 is similar to the preferred embodiment except that instead of providing a plurality of stepped heating surfaces, a single heating surface 76 is positioned within the casing 77 and spaced from the lower wall thereof, thus forming a lower chamber 78 within which a heating element 79 is mounted. Another chamber 80 is formed between spaced upper walls 81 and 82 and a heating element 83 is positioned within such chamber. A hinged front cover 84 is also provided with a transparent material 85 through which the contents of the housing may be viewed. Also, as in the preferred embodiment, one end is formed with double spaced vertical walls 87 and 88 thus forming a chamber 89. The wall 88 and the opposite end wall 90 are formed with a plurality of spaced apertures 91 and a rod 92 carries closure plates 93, the rod having a handle portion 94 at the outer end thereof. A vertical duct 96 is formed on the rear wall of the casing and gases from the heating chamber 97 pass through apertures 98 in a rear wall 99 into such duct. When it is desired to cool the heating surface 76, the closure plates are withdrawn from their apertures and cold air accordingly passes into the chamber 78, through the end chamber 89 and into a horizontal duct 100. From here they enter a by-pass 101 having a damper 102 and thence into the duct 96.

It will be apparent that the two herein described embodiments may be varied and modified considerably without departing from the spirit of the invention. In some instances, the casing may be dispensed with entirely and it will also be apparent that heating means other than an electrical unit may be employed. These are only a few of the modifications which are within the scope of the present invention.

What I claim is:

1. In a heating and cooling receptacle, the combination of an intake chamber having inner and outer walls, the inner wall having an oblique series of openings therethrough, the outer wall being provided with means to alternately permit and prevent a cooling fluid from passing therethrough into the intake chamber; a draught-chamber having inner and outer walls and being provided with an outlet opening and having an oblique series of openings through its inner wall; a stair-like series of oblique substantially tubular chambers between and against the inner walls of said intake chamber and draught-chamber and being respectively in open communication with the openings through said inner walls, the upper sides of said tubular chambers constituting heat-conducting shelves for receiving and holding materials to be treated; means to apply heat within the tubular chambers for heating said shelves and the material thereon; and means to effect a flow of cool fluid through said draught-chamber and tubular chambers and intake chamber.

2. The combination defined by claim 1, said openings in the inner walls being smaller than the internal cross-areas of the respective tubular chambers, so that the latter are partly closed by the said inner walls so as to retain the maximum of heat against escaping into the intake chamber and draught-chamber during operation of the heat-applying means.

3. The combination defined by claim 1, and means to introduce cool fluid under and against the series of tubular chambers for cooperation with said intake chamber and draught-chamber so as to facilitate the cooling of the shelves and material thereon after a heating operation.

4. The combination defined by claim 1, a front wall, a rear wall, and a cover, all united with said outer walls of the intake chamber and draught-chamber so as to form a receptive chamber; said front wall having a normally closed door that can be opened for gaining access to said shelves for placing materials on the shelves and removing the materials therefrom, at will of the user.

5. The combination defined by claim 1, a front wall, a rear wall, and a cover, all combined with said outer walls of the intake chamber and draught-chamber so as to form a receptive chamber for placing materials upon said shelves; said cover having a draught-outlet therethrough, and means to apply heat to said cover for preventing condensation of vapor thereon.

6. The combination defined by claim 1, a front wall, a rear wall, and a cover, all combined with said outer walls of the intake chamber and draught-chamber so as to form a receptive chamber to receive materials to be placed on said shelves, said cover having a draught outlet therethrough in open communication and cooperation with said receptive chamber of said draught-chamber.

7. The combination defined by claim 1, a front wall, a rear wall, and a cover, all combined with the outer walls of the intake chamber and a draught-chamber to form a receptive chamber for receiving materials to be treated on said shelves; said cover having a draught outlet therethrough and having a hollow air-insulated portion that includes a rearwardly and upwardly inclined baffle which terminates at said draught outlet and is effective to direct fluid to the draught outlet from said receptive chamber and from said draught-chamber, for purposes specified.

8. The combination defined by claim 1, a front wall, a rear wall, and a cover, all combined with said outer walls of the intake chamber and the draught-chamber so as to form a receptive chamber for receiving materials to be treated on said shelves; the greater part of said cover being hollow and provided with means to apply heat to the interior thereof for heating the lower side of the cover and thereby preventing condensation of moisture on said cover.

9. In a heating and cooling receptacle, the combination of a stair-like arrangement of substantially tubular heating chambers each including a heat-conducting shelf for receiving and holding material to be heated and cooled, heaters respectively within said heating chambers, means to control said heaters so the latter can be operated either selectively or collectively, said stair-like arrangement of heating chambers being enclosed within a casing which includes upright walls and a cover, which latter has a draught-outlet in open communication with said heating chambers, said cover also having a hollow portion, said hollow portion of the cover having a heater therein for preventing condensation of vapor on the cover.

10. A device of the class described comprising a plurality of elongated closed chambers disposed in stair-like arrangement, the upper walls of each of which form heating surfaces, an electrical heating element positioned in each chamber and adapted to impart heat to the heating surface, each chamber having an aperture in opposed walls thereof and manually actuated closure means for selectively closing the apertures in each chamber, a common duct communicating with each of such closed chambers when the closure means associated therewith are open, and suction means for withdrawing air from such common duct, whereby air will be drawn through such of the closed chambers as have their closure means open, thus cooling such chambers.

11. A device of the class described comprising a plurality of elongated closed chambers, the upper walls of which form heating surfaces, a housing enclosing all of said chambers and a door associated with one of the walls forming such housing, an electrical heating element positioned in each chamber and adapted to impart heat to the heating surface thereof, each chamber having an aperture in opposed walls thereof and manually actuated closure means for normally closing such apertures comprising a longitudinally movable rod and a plurality of closure plates carried thereby, a duct leading from the interior of the casing and adapted to withdraw gasses therefrom, a common duct communicating with each of such closed chambers when the closure means associated therewith are open, and suction means for withdrawing air from such common duct, whereby air will be drawn through such of the closed chambers as have their closure means open, thus cooling such chambers.

12. A device of the class described comprising a plurality of elongated closed chambers disposed in stepped relationship, one above the other, the upper walls of such chambers forming heating surfaces, means for selectively heating each of such surfaces comprising an electrical heating element positioned in each chamber, each chamber having an aperture in two opposed walls thereof and manually actuated closure means for normally closing such apertures comprising a closure plate for each aperture and a longitudinally movable rod carrying such plate, a housing enclosing said heating surfaces and means for withdrawing gasses from the housing, a duct communicating with each of such closed chambers when the closure means associated therewith are open, means connecting such duct with the gas withdrawing means for withdrawing air from such common duct, whereby air will be drawn through such of the closed chambers as have their closure means open, thus cooling such chambers and their heating surfaces.

13. A heating device comprising a horizontal plate forming a heating surface and adapted to receive articles to be heated, a casing enclosing the plate and a duct leading from the interior of the casing and adapted to withdraw gasses, a wall positioned beneath and spaced from said plate, and forming a closed chamber, a heating element within such chamber and adapted to impart heat to the plate, said chamber having a plurality of apertures in opposed walls thereof, closure plates for normally closing said apertures and common means for moving such plates away from the apertures comprising a rod carrying such plates at opposite ends thereof, a duct leading from said closed chamber to the first mentioned duct, whereby when the apertures in the closed chamber are open, air drawn from the duct will cool the closed chamber.

KARL GRUENEKLEE.